United States Patent [19]

Ikeda et al.

[11] Patent Number: 4,802,567

[45] Date of Patent: Feb. 7, 1989

[54] PLATE PROCESSING MACHINE

[75] Inventors: Hidekatsu Ikeda; Hidetoshi Miyama; Yoshihiko Kashiwabara, all of Kanagawa, Japan

[73] Assignee: Amada Company, Limited, Japan

[21] Appl. No.: 10,855

[22] Filed: Feb. 4, 1987

[30] Foreign Application Priority Data

Feb. 6, 1986 [JP] Japan .................. 61-15068[U]
Feb. 6, 1986 [JP] Japan .................. 61-15071[U]

[51] Int. Cl.⁴ .......................................... B65G 47/22
[52] U.S. Cl. ........................... 198/345; 198/346; 269/58; 414/225
[58] Field of Search ............... 198/339.1, 346, 345; 72/420; 269/58; 414/222, 225; 83/155, 155.1, 277

[56] References Cited

U.S. PATENT DOCUMENTS

| | | | |
|---|---|---|---|
| 3,834,213 | 9/1974 | Henzler et al. | 72/420 X |
| 4,399,675 | 8/1983 | Erdmann et al. | 72/420 X |
| 4,448,099 | 5/1984 | Kuroda et al. | 83/277 X |
| 4,510,789 | 4/1985 | Tomioka et al. | 72/420 X |
| 4,512,227 | 4/1985 | Salvagnini | 83/277 X |
| 4,523,749 | 6/1985 | Kindgren et al. | 269/58 X |
| 4,677,303 | 6/1987 | Erdman | 414/225 X |
| 4,683,789 | 8/1987 | Lopez | 83/277 X |

Primary Examiner—Robert J. Spar
Assistant Examiner—D. Glenn Dayoan
Attorney, Agent, or Firm—Wigman & Cohen

[57] ABSTRACT

In a plate processing machine such as punch press provided with a workpiece moving/positioning device (49) including a carriage base (53) movable in the longitudinal Y-axis) direction of the machine and a carriage (69) movable in the lateral (X-axis) direction of the machine, a carriage drive unit of an X-axis motor (79) and a reduction gear (77) for moving the carriage is disposed near a middle portion of the carriage base to balance the workpiece moving/positioning device, so that workpiece processing precision can be improved. Further, the width of a caterpillar table (82) fixed to the carriage base between two movable tables (81) also fixed to the carriage base is reduced to prevent vibration of the caterpillar table, so that scratches under the surface of a workpiece can be reduced. Furthermore, a caterpillar carry table (93) is disposed behind a process position where a tool set is arranged remote from the caterpillar table in synchronism with the caterpillar table in motion so as to be inclined front down to carry out processed parts in the same rearward direction.

10 Claims, 3 Drawing Sheets

PLATE PROCESSING MACHINE

BACKGROUND OF THE INVENTION

1. Field of the Invention

The present invention relates to a plate processing machine such as drilling machines punch presses etc. for processing a plate workpiece, and more specifically to a plate processing machine provided with a device for moving and positioning a plate workpiece in both the X- and Y-axis directions relative to a process position at which a tool set and wherein a die and a punch is arranged.

2. Description of the Prior Art

Drilling machines or punch presses are well known, such as a plate processing machine for automatically processing a plate workpiece in accordance with appropriate machining processes. In general, these machines are provided with a workpiece moving and positioning device for moving a workpiece in the X-axis direction (the lateral direction of the machine) and the Y-axis direction (the longitudinal direction of the machine) and positioning the workpiece at an appropriate process position.

In the conventional workpiece moving and positioning device, a carriage base reciprocably movable in the Y-axis direction is usually provided, and further a carriage having a pair of work clamping devices for holding a workpiece is mounted on the carrier base so as to be reciprocably movable is the X-axis direction. In more detail, the carriage base is arranged extending in the X-axis direction in such a way that both the ends thereof are movably supported by guide members disposed on both the ends of a machine base and extending in the Y-axis direction. The carriage is reciprocably supported by guide members provided on the base and extending in the Y-axis direction. Further, a drive unit for moving the carriage is usually mounted on one end of the carriage base due to a consideration of the convenience in assembling or maintenance work.

In the above-mentioned conventional workpiece moving and positioning apparatus, the carriage base is moved and positioned automatically in the Y-axis direction and the carriage is moved and positioned automatically in the X-axis direction in order to move a workpiece to a predetermined process position, both under the control of an NC system.

In the conventional device, however, when the above-mentioned workpiece moving and positioning operation is effected and therefore the carriage is moved toward one side of the base where the drive unit is mounted, an addition of a carriage weight and a drive unit weight is applied to one side of the base, so that the carriage base becomes inclined from the horizontal plane of the machine. In addition, a friction generated between the guide member and the carriage base on one side of the base where the drive unit is mounted increases greatly as compared with a friction generated between the two on the other side of the base remote from the drive unit; as a result, when the carriage base is moved in the Y-axis direction, there exists a tendency that one side of the carriage base loaded with the carriage weight and the drive unit weight is moved being delayed from the other side thereof, thus resulting in a problem such that the carriage base is somewhat inclined from the horizontal plane and from the X-axis and thus the precision in workpiece positioning operation is deteriorated on the order of several hundred millimeters, for instance, relative to a true machining position of the plate processing machine.

Further, in the plate processing machine, a workpiece is generally supported by such a construction that a pair of movable tables are provided integral with the carriage of the workpiece moving and positioning device and a fixed table is disposed between the two movable tables. In more detail, a workpiece is movably supported by a great number of free ball bearings rotatably arranged on the two movable tables and the fixed table.

Therefore, since a workpiece is supported by the free ball bearings in point contact manner, when the workpiece is moved at a high speed, the rotation of the free ball bearings cannot follow up the moving workpiece and therefore a relative sliding motion is produced between the workpiece and the free ball bearings, thus resulting in the other problem such that scratches are readily produced on the under surface of the workpiece.

To overcome the above problem, a structure has been developed such that a caterpillar table is arranged between the two movable tables so as to be movable together with the carriage base. In this arrangement, since the tables and the carriage base are moved together in the Y-axis direction when the carriage base is moved in the Y-axis direction to move a workpiece in the same direction, no relative sliding motion is advantageously produced between the workpiece and the tables. However, there still exist other problems as described below: For instance, in the case of a turret punch press, it is necessary to determine the dimension of the caterpillar table width a little greater than a diameter of the relatively large turret, in spite of a small process area where a punch and a die are arranged. That is, the width of the caterpillar table is extremely great in comparison with the processing area. Therefore, when the workpiece is being moved, a workpiece is brought into contact with the upper surface of a number of dies arranged on the turret under the same condition as in the conventional machine, thus scratches are readily produced on the workpiece.

In addition, if the caterpillar table vibrates during motion, scratches are further produced on the under surface of the workpiece, and additionally the workpiece positioning time is inevitably increased.

Furthermore, in the conventional plate processing machine, there exists a drawback in that since a processed workpiece is carried out toward movable tables, the space required for laying out a plate processing line is enlarged.

SUMMARY OF THE INVENTION

With these problems in mind, therefore, it is the primary object of the present invention to provide a plate processing machine provided with a workpiece moving positioning device such that the carriage base is not inclined when moved in the Y-axis direction, irrespective of the carriage movement position in the X-axis direction.

To achieve the above-mentioned object, a plate processing machine having a base and two guide members extending in a longitudinal Y-axis direction of the machine and disposed in parallel to each other on both ends of a lateral X-axis direction of the machine, according to the present invention, comprises: (a) a carriage base extending in be X-axis direction and supported by said two guide members on both ends thereof so as to the movable to and from a process position of the machine in the Y-axis direction; (b) a carriage having two clamping devices for clamping a workpiece to be processed and mounted on said carriage base so as to be movable to and fro along said carriage base in the X-axis direction, and (c) a carriage drive unit disposed near a middle portion of said carriage base to move said carriage, under a balanced condition in weight with respect to said carriage base. The carriage drive unit is an X-axis servomotor and a reduction gear unit is connected to said X-axis motor. The carriage base is symmetrical with respect to the central longitudinal axis of the machine.

The second object of the present invention is to provide a plate processing machine which can reduce scratches produced on the under surface of the workpiece moved and positioned in both the X- and Y-axis directions.

To achieve the above-mentioned object, the plate processing machine according to the present invention further comprises: (a) two movable tables fixedly connected to said carriage base in symmetry with respect to the central longitudinal line of the machine, for supporting a workpiece so as to be movable along said guide members; and (b) a caterpillar table disposed between said two movable tables and connected to said carriage base, the width of said caterpillar table being a little wider than a maximum width of a tool set disposed at the process position to reduce vibration of said caterpillar table. A plurality of work support rollers are arranged with respect to said two movable tables and said caterpillar table so as to be rotatable in the X-axis direction to move a workpiece when said carriage is moved relative to said carriage base.

The third object of the present invention is to reduce the space in which a plate processing process line is laid out.

To achieve the above-mentioned object, the plate processing machine according to the present invention further comprises: a caterpillar carry conveyor disposed behind the process position to move a processed workpiece in a rearward direction in synchronism with said movable tables and said caterpillar table both in motion. One end of said caterpillar carry conveyer near the process position is movable downward from a horizontal level to carry processed parts or scraps separated from the workpiece in the rearward direction.

DESCRIPTION OF THE PREFERRED EMBODIMENTS

Figure 1:
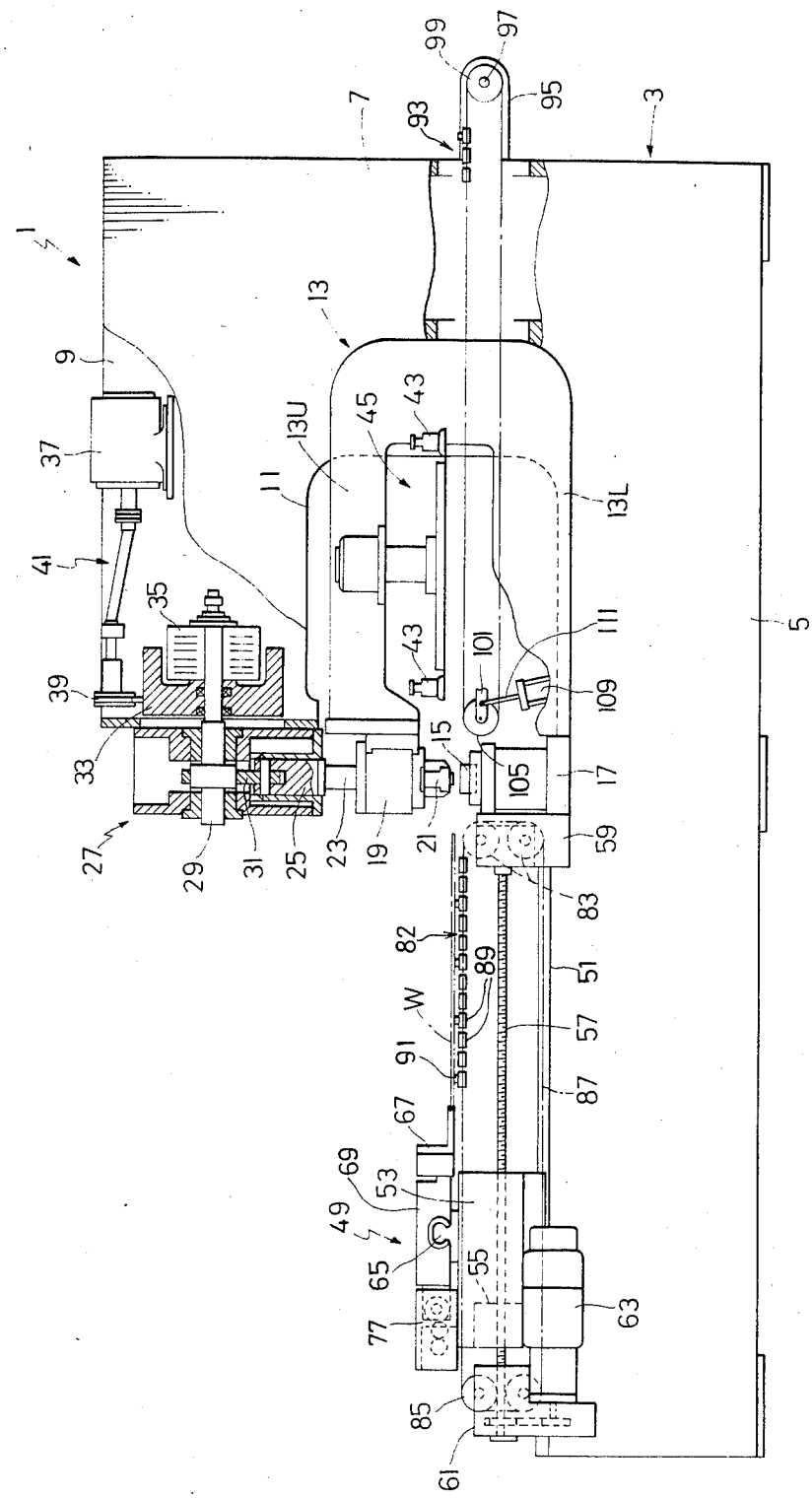
FIG. 1 is a side view, partly in cross section showing a punch press taken as an example of plate processing machines.

With reference to FIG. 1, a punch press taken as an example of plate processing machines to which the present invention is applied will be explained. In the same way as in the conventional punch press, the punch press shown in FIG. 1 is of C-shaped frame type, in which a frame 3 is composed of a base 5, a column 7, and an upper frame 9.

In order to hold a tool at a process position at which a plate workpiece W is processed, there is arranged a tool holder 13 of C-shaped frame type provided with an upper arm 13U and a lower arm 13L within a C-shaped throat portion 11 enclosed by the base 5, the column 7 and the upper frame 9. The lower arm 13L of this tool holder 13 is fixed to the upper surface of the base 5 with bolts. At the end of this lower arm 13L, a die holder 17 for supporting a die 15 as a lower tool is disposed. At the end of the upper arm 13U, a punch holder 19 is attached. Although not shown in detail, this punch holder 19 supports a vertical slider 23 so as to be movable up and down. A punch 21 for processing a workpiece W in cooperation with the die is fitted to the lower end of this vertical slider 23.

Therefore, after a workpiece W has been positioned at the processing position defined by the die 15 and the punch 21, when the punch 21 is lowered via the vertical slider 23 by appropriate means, the workpiece W is processed, as is well understood.

To move the vertical slider 23 and the punch 21 up and down, a ram 25 movable up and down is disposed over the punch holder 19. In more detail, a ram drive unit 27 for moving the ram 25 up and down is disposed on one end of the upper arm 9, and the lower end of the arm 25 is appropriately linked with the upper end of the vertical slider 23 supported by the punch holder 19.

To move the ram 25 up and down, an eccentric shaft 29 is rotatably supported in the ram drive unit 27. The eccentric portion of the eccentric shaft 29 is linked with the ram 25 via a connecting rod 31. A flywheel 33 is rotatably supported by the eccentric shaft 29, and a clutch-brake unit 35 for engaging or disengaging the rotating flywheel 33 with or from the eccentric shaft 29 is provided on the eccentric shaft 29. The structure of the clutch-brake unit 35 is of conventional type, therefore the description thereof being omitted herein.

To rotate the eccentric shaft 29 via the flywheel 33, a drive motor 37 is mounted on the upper arm 9. A drive shaft of this drive motor 37 is linked with a drive pulley 39 rotatably supported at the end of the upper arm 9 via an appropriate transmission mechanism 41 such as universal joint. The drive pulley 39 and the flywheel 33 are connected through a belt.

In the above-mentioned structure, when the flywheel 33 is rotated by the drive motor 37 and the clutch-brake unit 35 is switched to the engagement position, a rotational force of the flywheel 33 is transmitted to the eccentric shaft 29 to move the ram 25 up and down, so that the punch 21 is moved up and down through the vertical slider 23.

In order to automatically exchange a pair of punch 21 and die 15 located at the process position, there are provided a rotatable tool accommodating device 45 for accommodating a plurality of tool sets 43 (die and punch) on the outer periphery thereof and an automatic tool exchange device 47 (see FIG. 2) for exchanging a tool set held at the process position with a new tool set arranged on the tool accommodating device 45.

To move and position a workpiece W in the X- and Y-axis directions at the process position at which the punch 21 and the die 15 are located, the punch press 1 is provided with a workpiece moving-positioning device 49.

Figure 2:
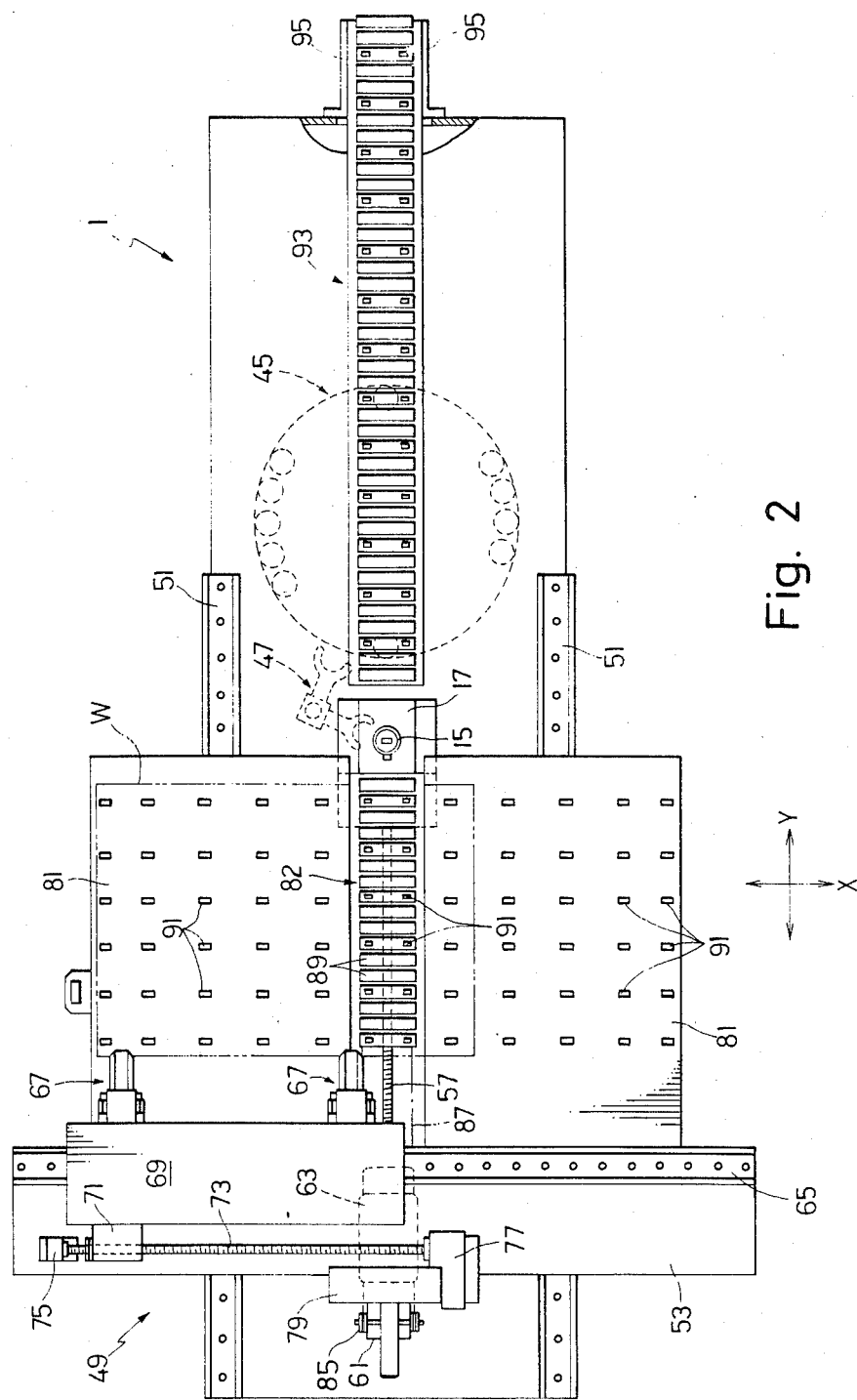
FIG. 2 is a plan partial view showing the punch press shown in FIG. 1.

In more detail, as shown in FIG. 2, two guide members 51 are disposed in parallel to each other extending in the Y-axis direction (the longitudinal direction of the machine) on both the sides of the base 5 of the X-axis direction (the lateral direction of the machine).

A carriage base 53 extending in the X-axis direction is movably supported by the two guide members 51 on the sides of the carriage base 53. This carriage base 53 is formed substantially symmetrical with respect to a central longitudinal line (Y-axis) of the machine. Two sliders (not shown) are attached to the under surface of the carriage base 53 on both ends of the carriage base 53 so as to slidably support the carriage base on and along the two guide members 51. That is, the carriage base 53 is movably supported by two guide members 51 via base sliders, so as to reciprocably move toward or away from the process position along the guide members 51.

To drive the carriage base 53 along the guide members 51, a nut member 55 (see FIG. 1) is disposed under the middle of the carriage base 53 in the X-axis direction. This nut member 55 is engaged with a ball screw 57 extending in the Y-axis direction. One end of the ball screw 57 is rotatably supported by a first U-shaped bearing block 59 mounted on the base 5 in the vicinity of the die holder 17; while the other end thereof is rotatably supported by a second prism-shaped bearing block 61 mounted on the other end of the base 5. To drive the ball screw 57, a Y-axis servomotor 63 is mounted on the other end of the base 5. A drive shaft of this Y-axis servomotor 63 and the ball screw 57 are linked with each other by an appropriate transmission mechanism such as timing belt, gear mechanism, etc.

Therefore, when the Y-axis servomotor 63 is controllably driven to rotate the ball screw 57, the carriage base 53 is moved and positioned along the Y-axis direction via the nut member 55 engaged with the ball screw 57.

In order to move and position a workpiece W in the X-axis direction, an X-axis guide member 65, extending in the X-axis direction perpendicular to the direction that the carriage base 53 is moved, is mounted on the carriage base 53. On this X-axis guide member 65, a carriage 69 having two work clamping devices 67 is movably supported. The above work clamping device 67 is conventional in structure, so that the description thereof is omitted herein.

A nut member 71 is attached on one end of the carriage 69, and a ball screw 73 extending in the X-axis direction is engaged with this nut member 71. One end of the ball screw 73 is rotatably supported by a bearing block 75 mounted on one end of the carriage base 53, while the other end of the ball screw 73 is rotatably supported by a reduction unit 77 mounted near the middle of the carriage base 53. To this reduction unit 77, an X-axis servomotor 79 extending toward the middle of the carriage base 53 is connected. The reduction unit 77 is of conventional type, so that the description thereof is omitted herein.

When the X-axis servomotor 79 is controllably driven to move the carriage 69 in the X-axis direction, a workpiece W is moved and positioned in the X-axis direction, as is well understood.

In the embodiment of the present invention, since the heavy reduction unit 77 and the heavy X-axis servomotor 79 are placed roughly at the middle of the longitudinal direction of the carriage base 53, the weight of the reduction unit 77 and the X-axis servomotor 79 is roughly balanced and an equally divided half weight is substantially equally applied to the ends of the carriage base 53. Therefore, it is possible to make equal the frictions generated between the carriage base 53 (i.e. the sliders of the carriage base) and the guide members 51 to each other on both the sides of the carriage base 53, so that the carriage base 53 will not be inclined from the horizontal flat surface.

Further, since the drive system such as the ball screw 57 for moving the carriage base 53 in the X-axis direction is located at roughly the middle of the longitudinal direction of the carriage base 53, when the carriage base 53 is moved in the Y-axis direction, the carriage base 53 is moved under a balanced condition without producing a delay at both the ends of the carriage base 53 in the Y-axis direction, that is, without being inclined with respect to the X-axis.

In this connection, where the carriage 69 is moved along the X-axis guide member 65 to move a workpiece W in the X-axis direction, a difference in friction of the carriage base 53 and the guide members 51 will be produced between both the ends of the carriage base 53 according to the position of the carriage 69. However, since the carriage 69 is light in weight as compared with the reduction unit 77 and the X-axis servomotor 79, it is possible to neglect the influence of this unbalance due to the movable carriage 69.

In the present embodiment, only a single drive system is used for moving the carriage base 53 in the Y-axis direction. However, it is also possible to dispose two drive systems in the vicinity of the two guide members 51 separately and to actuate the two drive systems in synchronism with each other.

To support a workpiece W clamped by the two work clamp devices 67 of the carriage 69, two movable tables 81 are separately attached to the carriage base 53 on both the ends thereof. Further, a caterpillar table 82 is disposed between these two movable tables 81.

In more detail, as shown in FIG. 1, four chain sprockets 83 are rotatably supported by brackets on both the sides of the first bearing block 59. Further, four other chain sprockets 85 are rotatably supported on both the sides of a second bearing block 61. A pair of endless chains 87 are wrapped around these sprockets 83, 85, respectively. The chains 87 are connected to the carriage base 53 so as to be movable together with the carriage base 53, and passed through the hollow portion of the first U-shaped bearing block 59. A number of tablet-shaped support plates 89 are arranged and supported by the two chains 87 at both the ends thereof at appropriate regular intervals so as to form a caterpillar table 82.

The length of the support plate 89, that is, the width of the caterpillar table 82 is small to such an extent as to be a little greater than a maximum diameter of the die 15, so that vibrations of the caterpillar table 82 is relatively small.

To smoothly move the workpiece W in the X-axis direction (in the vertical direction in FIG. 2), there are arranged a plurality of support rollers 91 on the upper surfaces of the movable tables 81 and on the support plates 89 of the caterpillar table 82. These support rollers 91 are rotatable when the workpiece W is moved only in the X-axis direction. That is, the workpiece W is supported by the support rollers 91 provided on the movable tables 81 and the caterpillar table 82.

When the workpiece W is moved and positioned in the Y-axis direction by the carriage base 53, since the movable table 81 and the caterpillar table 82 move together with the carriage base 53, no relative movement is produced between the workpiece W and the movable table 81, so that no scratches will be produced on the under surface of the workpiece W.

Further, when the carriage 69 is moved to shift the workpiece W in the X-axis direction, since the workpiece W and the support rollers 91 are in contact with each other in a relatively long line contact state and further the support rollers 91 are rotating, it is possible to extremely reduce the occurrence of scratches on the under surface of the workpiece W, as compared with when the workpiece W is moved under point contact as in free ball bearings.

Further, since the width of the caterpillar table 82 is very narrow to such an extent as to be a little wider than the maximum diameter of the die 15, even if the caterpillar table 82 is moved, the vibration is small, so that it is possible to reduce a harmful influence due to vibration upon the workpiece processing precision. In addition, since the under surface of the workpiece W is brought into contact only with the die 15 at the process position, it is possible to reduce the occurrence of the scratches on the under surface of the workpiece W.

After a workpiece W has been moved in the X- and Y-axis directions and positioned at the process position, a punching processing is made by the punch 21 and the die 15. In order to separate a relatively large-sized processed parts or scraps from a plate-shaped workpiece W and further to carry the processed parts or scraps away from the process position in the rearward direction, there is provided a caterpillar carry conveyer 93.

Figure 3:
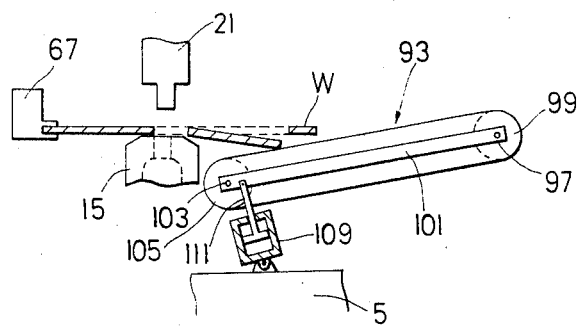
FIG. 3 is an illustration for assistance in explaining the operation of a caterpillar table.

In more detail, as shown in FIG. 1, a support shaft 97 extending in the X-axis direction is supported by a bracket 95 disposed on the column 7 on the frame 3 of the punch press 1. On both the ends of this support shaft 97, a pair of chain sprockets 99 driven by an appropriate servomotor (not shown) are rotatably supported. Further, on both the ends of the support shaft 97, one end of each of two support rods 101 (see FIG. 3) is supported. The other end of each of the support rods 101 extends to near the die holder 15.

A pair of chain sprockets 105 are rotatably supported via a shaft 103 at the other end of the support rods 101. A caterpillar carry conveyor 93 is wrapped around the chain sprockets 105 and 99. The support rods 101 are supported by piston rods 111 telescopically housed in a pair of pivotable cylinders 109 mounted on the base 5 at near the other end of the support rods 101.

Therefore, when the caterpillar carry conveyor 93 is moved by appropriately controlling the servomotor, in synchronism with the caterpillar table 82 in motion, to move the workpiece W in the Y-axis (rearward) direction, it is possible to support a part of the workpiece W without producing a relative slip between the workpiece W and the caterpillar table 82.

Further, since the other end of the carry conveyor 93 can be lowered front down by actuating the pivotable cylinders 109, when the other end of the carry conveyor 93 is kept at the up position, the carry conveyor 93 supports a part of the workpiece W fed out of the process position in the rearward direction. Further, when the other end of the carry conveyor 93 is kept at the down position, the carry conveyor 93 supports and carries out processed parts or scraps separated from the workpiece W through under the workpiece W in the rearward direction for the succeeding processing steps. That is, it is possible to carry out relatively large-sized products or scraps fed from the process position in the rearward direction by appropriately driving the caterpillar carry conveyor 93 in synchronism with the motion of the caterpillar table 82.

In the above structure, a workpiece W is moved and positioned at the process position by the movable tables 81 and the caterpillar table 82 disposed on the leftside from the tool set and further the processed workpiece is moved away from the process position by the caterpillar carry conveyor 93 disposed on the right side from the tool set in synchronism with each other in movement speed.

As described above, in the plate processing machine according to the present invention, since the carriage base is moved in the Y-axis direction under balanced conditions in weight, irrespective of the moving position of the carriage, that is, since there scarcely exists an inclination in the carriage moving toward the Y-axis direction from the horizontal plane and the X-axis, it is possible to improve the workpiece moving and positioning precision, that is, workpiece processing precision.

Further, since the width of the caterpillar table disposed between two movable tables of the carriage is formed sufficiently narrow to such an extent as to be a little wider than the maximum processing width at the process position, it is possible to reduce the vibration of the caterpillar table, so that scratches on the under surface of the workpiece can be reduced, that is, the finishing quality of the processed product can be improved.

Furthermore, since products or scraps separated from the workpiece can be carried out in the rearward direction by the caterpillar carry conveyor, it is possible to reduce the space where a complete plate processing line is laid out in a straight line and to readily and straightly feed the processed parts or products to the succeeding process.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A plate processing machine having a base and two guide members extending in a longitudinal Y-axis direction of the machine and disposed parallel to each other on both ends of a lateral Y-axis direction of the machine, which comprises:
   (a) a Y-axis motor;
   (b) a carriage base extending for a predetermined distance in the X-axis direction and supported by said two guide members on both ends thereof so as to be movable by said Y-axis motor to and from a process position of the machine in the Y-axis direction;
   (c) a carriage (69) having two clamping devices (67) for clamping a workpiece to be processed and mounted on said carriage base so as to be reciprocably movable along said carriage base in the X-axis direction said carriage extending longitudinally in the X-axis direction and having two longitudinal ends, said carriage further being movably connected to a screw rod for driving said carriage, said connection being made at one longitudinal end of said carriage;
   (d) a carriage drive unit (77, 79) being drivingly connected to said screw rod near a middle portion of said carriage base to move said carriage under a balanced condition in weight with respect to said carriage base; and (e) said screw rod having a length which is substantially less than the predetermined distance along which said carriage base extends.

2. The plate processing machine as set forth in claim 1, wherein said carriage drive unit is an X-axis servomotor (79) and a reduction gear unit (77) connected to said X-axis motor.

3. The plate processing machine as set forth in claim 1, wherein said carriage base is symmetrical with respect to the central longitudinal line of the machine.

4. A plate processing machine having a base and two guide members extending in a longitudinal Y-axis direction of the machine and disposed parallel to each other on both ends of a lateral X-axis direction of the machine, which comprises:

(a) a Y-axis motor;

(b) a carriage base extending in the X-axis direction and supported by said two guide members on both ends thereof so as to be movable by said Y-axis motor to and from a process position of the machine in the Y-axis direction;

(c) a carriage (69) having two clamping devices (67) for clamping a workpiece to be processed and mounted on said carriage base so as to be reciprocably movable along said carriage base in the X-axis direction;

(d) a carriage drive unit (77, 79) disposed near a middle portion of said carriage base to move said carriage under a balanced condition in weight with respect to said carriage base;

(e) two movable tables (81) fixedly connected to said carriage base in symmetry with respect to the central longitudinal line of the machine, for supporting a workpiece so as to be movable along said guide members; and (f) a Caterpillar table (82) disposed between said two movable tables (81) and connected to said carriage base, a width of said Caterpillar table (82) being slightly wider than a maximum width of a tool set disposed at the process position to reduce vibration of said Caterpillar table.

5. The plate processing machine as set forth in claim 4, wherein a plurality of work support rollers (91) are arranged in said two movable tables (82) and said Caterpillar table (81) so as to be rotatable in the X-axis direction to move a workpiece when said carriage (69) is moved relative to said carriage base.

6. The plate processing machine as set forth in claim 4, which further comprises:

a pivotal hydraulic cylinder member (109); and a caterpillar carry conveyor (93) disposed behind the process position in the Y-axis direction to move a processed workpiece in a rearward direction in synchronism with said movable tables (81) and said Caterpillar table (82) in motion.

7. The plate processing machine as set forth in claim 6, wherein one end of said Caterpillar carry conveyor (93) near the process position is selectively moved by said pivotal hydraulic cylinder member downward from a horizontal level to selectively carry processed parts or scraps separated from the workpiece in the rearward direction from the process position.

8. A plate processing machine having a base and two guide members extending in a longitudinal Y-axis direction of the machine and disposed in parallel to each other on both ends of a lateral X-axis direction of the machine, which comprises:

(a) a Y-axis motor (63);

(b) a carriage base extending in the X-axis direction and supported by said two guide members on both ends thereof so as to be movable by said Y-axis motor to and from a process position of the machine in the Y-axis direction;

(c) a carriage (69) having two clamping devices (67) for clamping a workpiece to be processed and mounted on said carriage base so as to be reciprocably movable along said carriage base in the X-axis direction; and (d) a carriage drive unit (77, 79) disposed near a middle portion of said carriage base to move said carriage under a balanced condition in weight with respect to said carriage base; and (e) two movable tables (81) fixedly connected to said carriage base in symmetry with respect to the central longitudinal line of the machine, for supporting a workpiece so as to be movable along said guide member; and (f) a Caterpillar table (82) disposed between said two movable tables (81) and connected to said carriage base, a width of said Caterpillar table (81) extending to near the process position being slightly wider than a maximum width of a tool set disposed at the process position to reduce vibration of said Caterpillar table.

9. A plate processing machine, comprising:

(a) a Y-axis motor (63);

(b) a workpiece moving/positioning device (49) disposed on a front side of a process position at which a tool set is arranged, for moving a workpiece in longitudinal Y-axis and lateral Y-axis directions to position the workpiece at the process position;

(c) a Caterpillar table (82) disposed at the middle of said workpiece moving/positioning device and moved by said Y-axis motor in the Y-axis direction together with said workpiece moving/positioning device to carry the workpiece near to the process position; and (d) a Caterpillar carry conveyor (93) disposed behind the process position to move a processed workpiece in a rearward direction from the process position in synchronism with said Caterpillar table (82) in motion.

10. The plate processing machine as set forth in claim 9, including a pivotal hydraulic cylinder connected to one end of said caterpillar carry conveyor (93) wherein said one end of said Caterpillar carry conveyor (93) near the process position is selectively movable downward by said pivotal hydraulic cylinder away from a horizontal level to selectively carry processed parts or scraps separated from the workpiece in the rearward direction.

* * * * *

UNITED STATES PATENT AND TRADEMARK OFFICE
CERTIFICATE OF CORRECTION

PATENT NO. : 4,802,567

DATED : February 7, 1989

INVENTOR(S) : HIDEKATSU IKEDA et al

It is certified that error appears in the above-identified patent and that said Letters Patent is hereby corrected as shown below:

IN THE SPECIFICATION

Column 2, line 67, "be" should be --the--;

Column 3, line 1, "the" should be --be--;

Column 6, line 4, "X-axis" should be --Y-axis--

IN THE CLAIMS:

Claim 1, line 4, "Y-axis" should be --X-axis--.

Claim 5, line 3, "(82)" should be --(81)--;
line 4, "(81)" should be --(82)--.

Claim 9, line 6, second occurrence of "Y-axis" should be --X-axis--.

Signed and Sealed this

Thirty-first Day of October, 1989

*Attest:*

DONALD J. QUIGG

*Attesting Officer*     *Commissioner of Patents and Trademarks*